United States Patent [19]

Yaeger

[11] Patent Number: 5,062,018
[45] Date of Patent: Oct. 29, 1991

[54] SWAGED HEAD ARM MOUNTING ARRANGEMENT FOR DISC DRIVES USING SHAPE MEMORY ALLOY

[75] Inventor: John R. Yaeger, Santa Clara County, Calif.

[73] Assignee: Seagate Technology, Inc., Scotts Valley, Calif.

[21] Appl. No.: 504,949

[22] Filed: Apr. 5, 1990

[51] Int. Cl.⁵ .......................... G11B 5/48; G11B 21/16
[52] U.S. Cl. ......................................... 360/104; 29/447
[58] Field of Search ............................... 360/104–106; 29/447

[56] References Cited

U.S. PATENT DOCUMENTS 4,934,743  6/1990  Kapgan ............................ 29/447 X
4,994,931  2/1991  Foote ............................... 360/104 X Primary Examiner—A. J. Heinz
Attorney, Agent, or Firm—Flehr, Hohbach, Test, Albritton & Herbert

[57] ABSTRACT

An improved flexure mounting arrangement is provided for disc drive systems. The disc drive's head positioning assembly has one or more platform each one of which has an aligned opening therein. The flexure assemblies each include a mounting portion having an opening therein that is aligned with the platform openings. A shape-memory tube formed from a shape memory alloy material is swaged within the aligned openings to firmly couple the flexure assemblies to the head positioner assembly. The shape memory alloy material has martensitic and austenitic phase conditions. In one of the phase conditions, the shape-memory tube is firmly swaged within the aligned openings, while in the other phase condition, the shape-memory tube loosely fits within the aligned openings such that it may be readily inserted and removed. In a preferred aspect of the invention, the shape-memory tube is in the first phase condition at ambient temperatures and may be transformed to the second phase condition only by significant cooling. In a method aspect of the invention, the shape-memory tube is removed by spraying freon into the center of a tubular shaped shape-memory tube in order to transform the shape-memory tube into the second phase condition. In the second phase condition, the shape-memory tube may be readily withdrawn from the head positioner assembly.

13 Claims, 1 Drawing Sheet

SWAGED HEAD ARM MOUNTING ARRANGEMENT FOR DISC DRIVES USING SHAPE MEMORY ALLOY

The present invention relates generally to Winchester type disc drives. More particularly, an improved head arm/flexure mounting arrangement is disclosed for coupling one or more flexure assemblies or head arms to a head positioning assembly using a swaged shape memory metal.

BACKGROUND OF THE INVENTION

Disc drive machines record and reproduce information stored on a recording media. Typical hard disc drives, often referred to as Winchester disc drives include a plurality of vertically-aligned, rotating information storage discs, each having at least one associated magnetic read/write head or slider that is adapted to transfer information between the disc and an external computer system. The information storage discs are journaled about a spindle motor assembly capable of rotating the discs at high speeds. Each slider is carried by an elongated flexure arm. The flexure arms, in turn, are vertically aligned and carried by a single head positioner assembly. The head positioner assembly is adapted to move the sliders back and forth in unison across the face of the vertically aligned discs. The head positioner assembly is traditionally either rotationally mounted or takes the form of a carriage that is free to move back and forth along a single axis. In either case, the head positioner assembly is adapted to precisely position the heads relative to the magnetic information storage discs.

A wide variety of flexure arm mounting techniques are known to the prior art. During operation, the sliders and the flexures are occasionally known to fail and require repair. Therefore, it is desireable to provide a flexure mounting structure that allows ready replacement of the flexures. One conventional manner for mounting the head arms utilizes a head positioner assembly having a plurality of vertically aligned support platforms (often referred to as ears). The vertically aligned platforms, together with the base from which they extend are frequently referred to as an E-block. One or two head arms are then mounted to each platform with one or two screws extending vertically through the vertically aligned ears to hold all of the head arms to their respective ears. One drawback of such an approach is that it is extremely important that once set, the heads move laterally as little as possible relative to the head positioner assembly. Movements on the order of several millionths of an inch can cause difficulties. However, in the mounting arrangement described above, internal torsional stresses are induced while initially tightening the screws during assembly. Thermal expansions and contractions within the screws and head positioner assembly can induce additional stresses within the screws. These stresses combine to cause the screws to unwind a minute amount over the operational life of the drive which results in lateral head movements large enough to cause troubles. Therefore, during production, the disc drive must be run through at least one thermal baking and cooling cycle to eliminate thermal stresses within the disc drive components including the flexure mounting arrangement. The thermal baking and cooling cycle is extremely time consuming and creates one of the major production line delays.

Therefore, it is desireable to provide a flexure mounting structure that does not require thermal baking and cooling to minimize lateral movements of the heads.

Another approach to mounting head arms to an E-block style head positioning assembly is disclosed in U.S. Pat. No. 4,829,395 to Coon et al.. The load beam/flexure assembly for mini Winchester disc drives described by Coon uses ball staking to form a swage connection between the head arm and the support platform. However, since no more than two head arms are secured by the swaging arrangement disclosed by Coon, an undesirably large number of parts are used to secure a multiplicity of head arms to the E-block. Furthermore, such an arrangement is difficult to disassembly when it becomes necessary to replace a worn slider or flexure assembly.

In recent years there have been several attempts to take advantage of the shape memory metal phenomenon to accomplish electromechanical functions in disc drives. The phenomenon of shape memory is, of course, well understood. It is based on the thermoelastic martensitic transformation which is briefly explained hereunder. A shape memory alloy, such as a Ni-Ti alloy, has a high temperature austenitic phase wherein the crystal structure is body center cubic. When cooled below its transformation temperature, the austenitic structure undergoes a diffusionless shear transform into a highly twined martensitic crystal structure. In the martensitic phase, the alloy is easily deformed by the application of a small external force. However, in the austenitic phase, the alloy is very strong and is not easily deformed. When the alloy is heated through its transformation temperature, the martensitic phase is elastically returned to the austenitic phase (referred to as an inverse transformation) according to a given ordered crystal and orientation law. A notable characteristic of the alloy is the extremely large recovery force that is generated when returning to the austenitic phase. This recovery force can be used advantageously in a wide variety of manners. When properly formed, the shape memory metal also has some shape memory when returning to the martensitic phase.

SUMMARY OF THE INVENTION

Accordingly, it is a primary objective of the present invention to provide a novel method of attaching flexure assemblies to a head positioning assembly using a low number of parts. Another objective is to provide an attaching arrangement that allows flexure assemblies to be easily replaced in the event of a failed slider or flexure arm.

To achieve the foregoing and other objects and in accordance with the purpose of the present invention, an improved flexure mounting arrangement is provided for a disc drive system having a head positioner assembly disposed within a housing for locating one or more transducer sliders relative to a recording media also disposed within the housing. The head positioning assembly has one or more platforms each of which is suitable for supporting at least one flexure assembly. The flexure assemblies are each adapted to carry a slider. Each flexure assembly includes a mounting portion having an opening therein. The platform also has an opening therein, which is aligned with the flexure mount opening. An element of a shape memory alloy, preferably in the form of a coupling tube, is swaged within the aligned openings to firmly couple the flexure assembly(s) to the head positioner assembly. The shape memory alloy material has martensitic and austenitic phase conditions. In the strong austenitic phase condition, the shape-memory tube is firmly swaged within the aligned openings, while in the weak martensitic phase condition, the shape-memory tube loosely fits within the aligned openings during installation such that it may be readily inserted into the openings. The flexure assemblies referred to above may take the form of a simple flexure arm or a flexure arm carried by a head arm.

In a preferred aspect of the invention, the shape-memory tube is in the austenitic phase condition at ambient temperatures and may be transformed to the second (martensitic) phase condition only by significant cooling. In a method aspect of the invention, the coupling tube is removed by spraying freon coolant into the center of the shape-memory tube in order to transform the coupling tube into the lower temperature martensitic phase condition. In the second phase condition, the coupling tube may be readily withdrawn from the head positioner assembly without damaging the positioner assembly so that another flexure can be attached.

BRIEF DESCRIPTION OF THE DRAWINGS

The features of the present invention that are believed to be novel are set forth with particularity in the appended claims. The invention, together with further objects and advantages thereof, may best be understood by reference to the following description taken in conjunction with the accompanying drawings in which:

DETAILED DESCRIPTION OF THE DRAWINGS

In accordance with the present invention, a flexure mounting arrangement is disclosed for coupling flexure assemblies to a head positioning assembly in conventional disc drives. A coupling element formed from a shape memory alloy is provided to firmly secure the flexure assemblies to the head positioning assembly.

Figure 2:
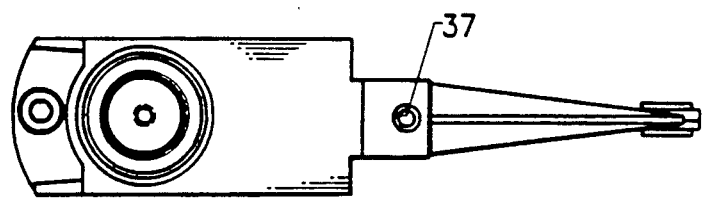
FIG. 2 is a top view of the head positioner assembly shown in FIG. 1.
Figure 1:
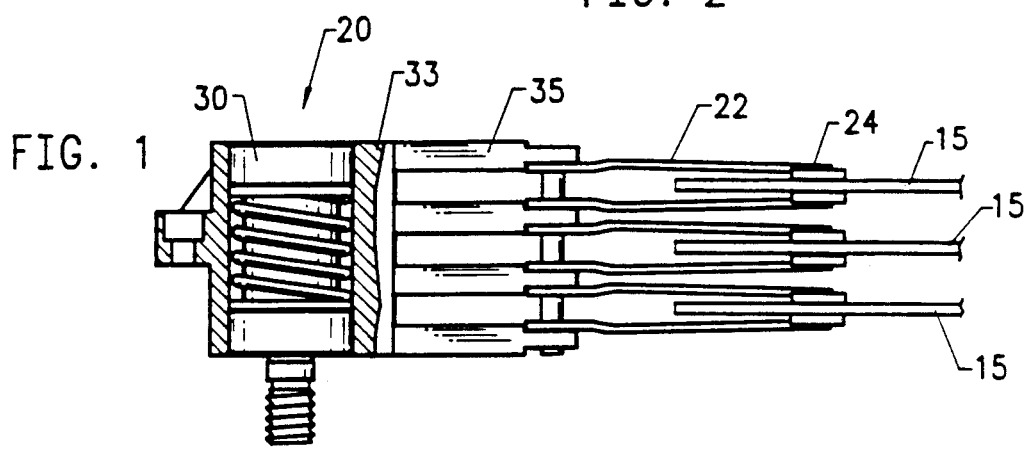
FIG. 1 is a side view of a head positioner assembly incorporating a coupling tube in accordance with the present invention to secure the flexure assemblies.
Figure 3:
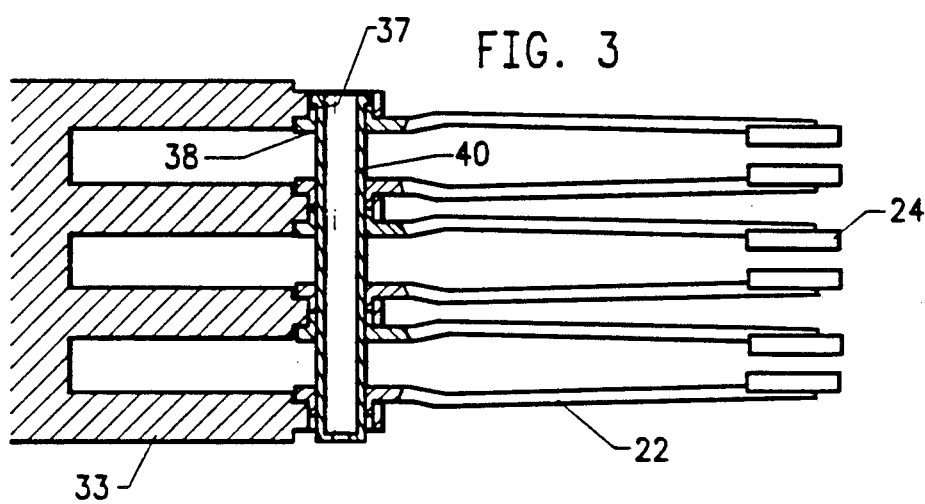
FIG. 3 is a cut away side view of the head positioner assembly shown in FIG. 1.

Referring initially to FIGS. 1-3, the pertinent portions of a disc drive incorporating the teachings of the present invention are shown in diagrammatic form. A typical Winchester type disc drive includes a plurality of information storage discs in the form of magnetic discs 15 that are journaled about a spindle motor assembly within a housing having upper and lower casing members respectively. For clarity, only a portion of the information storage discs 15 are shown. In the embodiment of the disc drive chosen for the purpose of illustration, three spaced apart information storage discs 15 are utilized.

Each information storage disc 15 has a multiplicity of concentric information storage tracks for recording information. A conventional head positioner assembly 20 is rotatably mounted between the upper and lower casing in one corner of the housing. The head positioner assembly carries a plurality of elongated flexure arms 22 that each carry a magnetic read/write data head (slider) 24 for reading information from and writing information onto the information storage discs 15. One of the flexures functions as a servo arm flexure which carries a servo head for accurately positioning the remaining sliders relative to the information storage tracks. A voice coil motor (not shown) is adapted to precisely rotate the head positioner assembly 20 back and forth such that the sliders move in unison across the information storage discs.

The head positioner assembly 20 has a pivot bearing 30 and an E-block 33. The E-block has a plurality of vertically aligned platforms 35 that extend outwardly towards the information storage disc. The platforms each have a circular platform opening 37 centered near their distal ends, with the various platform openings 37 also being vertically aligned. Each platforms 35 is arranged to support a flexure arm 22 on both its top and bottom surfaces. Thus, the top and bottom surfaces of the platforms 35 may be either flat or slightly notched to receive the flexure arm 22. Each of the flexure arms 22 has a circular flexure opening 38 towards its proximal end (adjacent the platforms) and carries a slider 24 on its distal end. The flexure openings 38 are substantially the same size as the platform openings 37.

An attachment element 40 is provided to secure the flexure arms 22 to their associated platforms 35. In the described embodiment, the coupling element is tubular in nature and is formed from a shape memory alloy. The tube 40 is inserted through the entire stack of aligned platforms and flexures and is arranged to form a firm swaged connection between the flexures 22 and the head positioner assembly 35. The shape memory metal used to form the coupling tube 40 has two distinct phases and is designed to assume a slightly different shape in each of the phases. In one of the phases, the coupling tube has a diameter appropriate to firmly secure the flexures 22 to the platforms 35 with a tightly swaged connection. In the described embodiment, the shape memory metal is chosen such that it is maintained in the stronger austenitic phase at ambient temperatures and it is in the austenitic phase that the tightly swaged connection is formed. In the martensitic phase, prior to installation, the diameter of the tube is slightly reduced and the tube is somewhat elongated.

Figure 4:
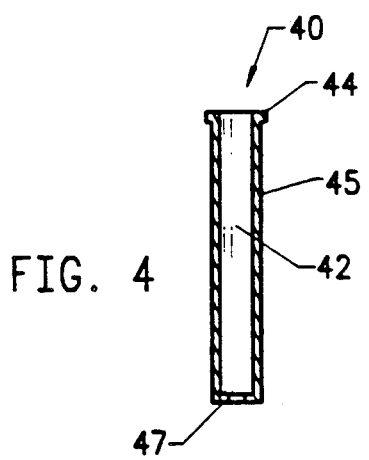
FIG. 4 is a cross sectional view of the coupling tube shown in FIG. 1.

Referring next to FIG. 4, the shape of the coupling element will be described. The coupling element 40 is tubular in nature with its opposite ends each being slightly rolled. Thus, there is an elongated hollow center portion 42. The upper end 44 is rolled slightly outward so that it has a larger diameter than the body 45 of the cylindrical coupling tube. In contrast, the lower end 47 is rolled slightly inward such that it has a slightly smaller diameter than the body of the coupling tube. Thus, when the coupling tube is dropped into position, the lower end does not catch any of the opening edges and the upper edge properly positions the tube by engaging the upper platform.

Figure 5:
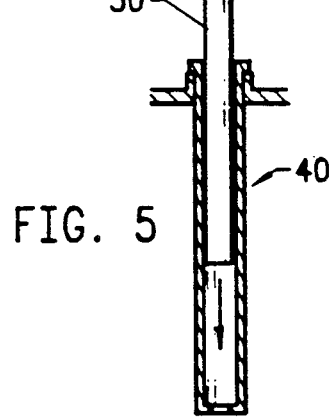
FIG. 5 is a schematic cross sectional view of the coupling tube being stretched prior to its insertion into the head positioner assembly.

Referring next to FIG. 5, the fabrication and installation of the shape memory coupling tube 40 will be described. The coupling tube is originally formed in its austenitic phase at its desired diameter when swaged within the E-block 33. To install the shape memory coupling tube, the tube is cooled with freon below its transformation temperature. At this point a small diameter rod 50 is inserted into the hollow center portion 42 until it engages the lower end 47 of the tube. The shape-memory tube 40 (which is now in its martensitic state) is then stretched by extending the rod. During the stretching, the outer diameter of the coupling tube is reduced. In this cooled and stretched state, the coupling tube is dropped into the aligned openings in the E-block with the flexure arms 22 positioned in the appropriate places. As indicated above, the upper rim of the coupling tube engages the upper surface of the top platform to properly position the tube. The flexures 22 are precisely positioned and the coupling tube 40 is allowed to warm up. When it warms through its transformation temperature, the martensitic phase is elastically returned to the austenitic phase and most importantly, the tube recovers its original shape upon its return to the austenitic phase. Thus, the tube's outer diameter increases to its original diameter, thereby forming a strong swaged connection between the flexures 22 and the platforms 35 of the E-block 33. Since the coupling tube 40 is cut to its desired length before the elongation, it also recovers to the desired length.

It should be appreciated that with the described coupling tube arrangement, the flexures 22 can relatively easily be disassembled from the E-block 33 by spraying sufficient freon into the tube's hollow center portion 42 to transform the tube 40 to its martensitic phase. In this phase, the coupling tube 40 is relatively pliable and may even revert somewhat to its elongated state. Regardless, it may be readily withdrawn from the E-block 33 to release the flexures 22. Alternatively, the entire drive can be refrigerated to a temperature below the transition temperature of the shape memory alloy used for the coupling tube. With such refrigeration, again, the coupling tube may be readily withdrawn from the E-block since the tube is in its martensitic state.

By way of example, a suitable shape memory metal is a Ni-Ti alloy that is mixed to have a transformation temperature at least twenty degrees Fahrenheit below the expected operating and ambient temperatures expected to be encountered by the drive. Thus, by way of example, a transformation temperature in the vicinity of approximately negative twenty degrees Fahrenheit is appropriate. Thus, at any realistic operating temperature for the disc drive, the flexures are firmly held in place.

Although only one embodiment of the present invention has been described herein, it should be understood that the present invention may be embodied in many other specific forms without departing from the spirit or scope of the invention. Particularly, it should be appreciated that the actual design of the head positioner assembly and the flexure assemblies are not important to the invention. For example, the head positioner assembly does not need to include an E-block as in the described embodiment. Similarly, conventional load beams, flexure mounts and other coupling arrangements may be used between the head positioner assembly and the sliders. Clearly, in embodiments wherein the flexures are carried by flexure mounts (as, for example, described in U.S. Pat. No. 4,893,205 or by elongated load arms/head arms, the described coupling arrangement can be used to couple the head arms or flexure mounts directly to the head positioning assembly. In such arrangements any flexures carried by the head arms or flexure mounts may be attached to their associated support by conventional means such as riveting.

The actual number of flexures held in place by the coupling tube is also not critical to the invention. It is further comtemplated that the shape-memory tube could be sufficiently short as to attach only one flexure at a time to the head positioner, thereby negating the need to disconnect all the flexures if only one needs to be repaired/replaced, and to allow the discs 15 to penetrate further into the E-block without being interferred with by the shape-memory tube. It is further contemplated that the coupling element could take on geometries other than the tubular geometry described. It should also be apparent that there are a variety of shape memory materials that could be chosen to form the cooling tube. Therefore, the present examples and embodiments are to be considered as illustrative and not restrictive, and the invention is not to be limited to the details given herein, but may be modified within the scope of the appended claims.

I claim:
1. A disc drive comprising:
   an information storage disc;
   a slider transducer for transferring information between the information storage disc and an external system;
   a flexure assembly that carries the slider, the flexure assembly including a mounting portion having an opening therein; relative to the information storage disc, the head positioner assembly including a platform for supporting the flexure assembly, the platform having an opening aligned with the flexure opening; and
   a shape-memory element swaged within the aligned openings to firmly couple the flexure assembly to the head positioner assembly, the shape-memory element being formed from a shape memory alloy material having martensitic and austenitic phase conditions, wherein in a first one of said phase conditions, the shape-memory element firmly secures the flexure assembly to the head positioner assembly and wherein when the shape-memory element is in a second one of said phase condition, the shape-memory element loosely fits within the aligned openings.

2. A disc drive as recited in claim 1 wherein the shape-memory element is a shape-memory tube that is tubular in shape.

3. A disc drive as recited in claim 2 further including a plurality of flexure assemblies and wherein:
   said head positioner assembly has a plurality of vertically aligned platforms, the platforms each having an aligned opening and carrying at least one of said flexure assemblies; and
   said shape-memory tube extends through each of said platform openings and through each of the flexure openings to firmly secure all of said flexure assemblies to the head positioner assembly when said shape-memory tube is in said first phase condition.

4. A disc drive as recited in claim 2 wherein the shape-memory tube is fabricated from a Ni-Ti alloy.

5. A disc drive as recited in claim 2 wherein the flexure assembly includes a flexure arm that carries the slider at a distal end and has the flexure opening adjacent its proximal end.

6. A disc drive as recited in claim 2 wherein the flexure assembly includes a head arm that has the flexure opening adjacent its proximal end.

7. A method of constructing a disc drive as recited in claim 2 comprising the steps of:
   fabricating the shape-memory tube in the first phase such that the diameter of the shape-memory tube is equal to its desired swaged diameter;

transforming the shape-memory tube to the second phase and elongating the transformed tube;

inserting the elongated shape-memory tube into the head positioner assembly while the shape-memory tube remains in the second phase; and transforming the inserted shape-memory tube back to the first phase and allowing the shape-memory tube to recover its original shape to form a secure swaged connection between the head positioning assembly and the flexure assembly.

8. A method of removing the shape-memory tube from the head positioner assembly in the disc drive recited in claim 2 comprising the steps of:

spraying freon into a hollow center portion of the shape-memory tube to cool the shape-memory tube such that it transforms to the second phase condition; and removing the cooled shape-memory tube from the aligned openings to decouple the flexure assembly from the head positioner assembly.

9. A flexure mounting arrangement for an information storage system having a head positioning assembly for positioning a plurality of transducer heads relative to a recording media, each transducer head being carried by a flexure assembly having an opening therein, the head positioning assembly having at least one platform for supporting the flexure assemblies, the platform having an opening aligned with the flexure openings, the flexure mounting arrangement including a shape-memory tube swaged within the aligned platform and flexure openings to firmly couple the flexure assemblies to the head positioner assembly, the shape-memory tube being formed from a shape memory alloy material having martensitic and austenitic phase conditions, wherein in a first one of said phase conditions, the shape-memory tube firmly secures the flexure assembly to the head positioner assembly and wherein when the shape-memory tube is in a second one of said phase condition, the shape-memory tube loosely fits within the aligned openings.

10. A disc drive as recited in claim 9 wherein said head positioner assembly has a plurality of vertically aligned platforms, the platforms each having an aligned opening and carrying at least one of said flexure assemblies and said shape-memory tube extends through each of said platform openings and through each of the flexure openings to firmly secure all of said flexure assemblies to the head positioner assembly when said shape-memory tube is in said first phase condition.

11. A method of removing the shape-memory tube from the head positioner assembly in the information storage system recited in claim 9 comprising the steps of:

spraying freon into a hollow center portion of the shape-memory tube to cool the shape-memory tube such that it transforms to the second phase condition; and removing the cooled shape-memory tube from the aligned openings to decouple the flexure assemblies from the head positioner assembly.

12. A flexure mounting arrangement for an information storage system having a head positioning assembly for positioning a transducer head relative to a recording media, the transducer head being carried by a flexure assembly having an opening therein, the head positioning assembly having a platform for supporting the flexure assembly, the platform having an opening aligned with the flexure opening, the flexure mounting arrangement including a shape-memory element swaged within the aligned openings to firmly couple the flexure assembly to the head positioner assembly, the shape-memory element being formed from a shape memory alloy material having martensitic and austenitic phase conditions, wherein in a first one of said phase conditions, the shape-memory element firmly secures the flexure assembly to the head positioner assembly and wherein when the shape-memory element is in a second one of said phase condition, the shape-memory element loosely fits within the aligned openings.

13. A method of removing the shape-memory tube from the head positioner assembly in the information storage system recited in claim 12 comprising the steps of:

spraying freon onto the shape-memory element to cool the shape-memory element such that it transforms into the second phase condition; and removing the cooled shape-memory element from the aligned openings to decouple the flexure assembly from the head positioner assembly.

* * * * *